US006450332B1

(12) United States Patent
Courchesne

(10) Patent No.: US 6,450,332 B1
(45) Date of Patent: Sep. 17, 2002

(54) CASE FOR STORING A COMPACT DISC

(75) Inventor: Simon Courchesne, St-Cyrille (CA)

(73) Assignee: Technologie ANSI, Drummondville (CA)

( * ) Notice: Subject to any disclaimer, the term of this patent is extended or adjusted under 35 U.S.C. 154(b) by 0 days.

(21) Appl. No.: 09/890,590

(22) PCT Filed: Nov. 21, 2000

(86) PCT No.: PCT/CA00/01383

§ 371 (c)(1),
(2), (4) Date: Aug. 3, 2001

(87) PCT Pub. No.: WO01/43131

PCT Pub. Date: Jun. 14, 2001

(30) Foreign Application Priority Data

Dec. 6, 1999 (GB) ............................................. 9928651

(51) Int. Cl.[7] ............................................... B65D 85/57
(52) U.S. Cl. .................................... 206/308.1; 312/9.63
(58) Field of Search .............................. 206/307, 308.1, 206/309, 310, 493; 312/9.1, 9.11, 9.16, 9.63

(56) References Cited

U.S. PATENT DOCUMENTS

| 5,158,176 A | | 10/1992 | Wolf | |
| 5,533,615 A | * | 7/1996 | McCamy | 206/308.1 |
| 5,715,938 A | * | 2/1998 | Cheris et al. | 206/308.1 |
| 6,056,117 A | * | 5/2000 | Courchesne | 206/308.1 |
| 6,286,671 B1 | * | 9/2001 | Liu et al. | 206/308.1 |
| 6,318,550 B1 | * | 11/2001 | Giovinazzi | 206/308.1 |

FOREIGN PATENT DOCUMENTS

| CA | 2 197 488 | 8/1998 |
| CA | 2 202 315 | 10/1998 |
| DE | 196 02 782 | 7/1997 |
| WO | WO 98 36415 | 8/1998 |

* cited by examiner

Primary Examiner—Luan K. Bui
(74) Attorney, Agent, or Firm—Collard & Roe, P.C.

(57) ABSTRACT

A CD carrying case having a built-in pop up cover is disclosed. The case comprises a box-like base shell adapted to receive the compact disc and a cover shell sized to fit over the base shell and having a rear end hingely connected to a rear end of the base shell. The cover shell is pivotable between an open position away from the base shell for opening the case and a close position against the base shell for closing the case. The case further comprises a locking mechanism for releasasly locking the cover shell in the close position and at least one torsional spring element adapted to cooperate with the locking mechanism for biasingly popping up the cover shell in the open position as the locking mechanism is released. The case disclosed combines simplicity and inexpensiveness to manufacture with durability and trouble-free in operation. The case for storing a CD in accordance with the present invention is further reliable and long lasting since it does not require the conventional fragile plastic legs and it minimizes the amount of components required to perform the pop-up opening operation.

10 Claims, 4 Drawing Sheets

CASE FOR STORING A COMPACT DISC

CROSS REFERENCE TO RELATED APPLICATIONS

Applicants claim priority under 35 U.S.C. §119 of Great Britain Application No. 9928651.0, filed: Dec. 6, 1999. Applicants also claim priority under 35 U.S.C §120 of PCT/CA00/01383, filed: Nov. 21, 2000. The international application under PCT article 21 (2) was published in English.

FIELD OF THE INVENTION

The present invention relates to the field of compact discs and is particularly concerned with a case for storing a compact disc having a built-in pop-up cover.

BACKGROUND

Compact discs (hereinafter called Cds) are recording media from which recorded information can be read out by means of a laser beam. By virtue of the extremely high density and fidelity of the recorded information therein, compact discs are becoming increasingly popular.

Typical compact discs have a flat disc-shaped body provided with a central aperture which facilitates the exact mounting on a read-out instrument such as a compact disc player.

While the CDs are relatively rugged and forgiving of minor scratches, dust and debris, they still must be stored and given protection. Indeed, scratches that sufficiently scatter the laser beam can block reading of the encoded information. A disc protective container also serves for the display of a label that attracts the buyer and informs the user of the disc.

Accordingly, when not in use, the compact discs are usually kept in compact disc carrying cases. These laser discs carrying cases commonly comprise a cover shell hinged to a base shell and locked by lock means. A tray is typically provided within the base shell for receiving and holding the disc. The tray may have a central engagement means for holding the center aperture of the CD. Commonly, those engagement means are rosettes typically made up of a series of tines raised in a circle and radially extending inward towards a center pushing area.

One of the major drawbacks associated with such conventional CD carrier is the difficulty with which the cover shell is pivoted from the base shell in an open position. Indeed, because the cover and base shell are typically formed of clear polystyrene, it is difficult to distinguish them. Consequently, it is not uncommon for the user, in attempting to grasp the base shell with one hand, to mistakenly place the thumb and fingers of that hand on the cover side walls, thinking them to be part of the platform, while correctly placing the fingers of the other hand on the platform back wall and lifting, with the thumb of that hand, the cover front border. Since both hands are inadvertently holding the cover, the container cannot be opened.

The proper technique for opening most of the cases presently on the market is to place the fingers of both hands on the base shell back wall, the thumb of both hands on the base shell front wall, one of which lifts the cover front border. While this works relatively well, once one is experienced, the operation can prove to be difficult since it requires manual dexterity.

Prior attempts to provide CD carrying cases which are more easy and simple to open proved to be unsatisfactory as those prior art cases are of complex construction and expensive to manufacture. Examples of such prior art cases are described by way of examples, in U.S. Pat. Nos. 5,000,316; 5,213,209; 5,265,721; 5,346,074; 5,515,979; 5,526,926; 5,549,199.

Also known in prior art, there are the laid-open applications GB-9,517,521 and GB-9,6 11,747, both in the name of Courchesne, the inventor of the present invention, which disclose CD carrying cases having a built-in pop-up cover comprising essentially a push-button for releasably locking the cover of the case on the base shell and cooperating with a V-shaped leaf-spring mounted at the rear end of the case on a hinge component. In each of those documents, the leaf-spring has an arm abutting on the top wall of the cover and another arm abutting on the bottom wall of the base shell. One of the drawbacks with CD cases is that it is still too expensive to be economically feasable.

Another major drawback associated with conventional CD carrier is the presence, in the cover shell of a pair of legs hingely connecting the cover shell to the base shell. These legs are fragile and are often accidentally broken during the opening of the cover. As results, the CD carrier is no longer useful since the cover shell will not remain in the close position to protect the CD.

Therefore, there is still a need for an improved CD carrying case that is economically feasable, long lasting and easy to built and use.

SUMMARY OF THE INVENTION

An object of the present invention is to provide a case for storing a compact disc that satisfies these above-mentioned needs.

In accordance with the present invention, this object is achieved with a case for storing a compact disc characterized in that it comprises a box-like base shell formed of a planar bottom wall, two opposite side walls, a rear wall and a front wall. The base shell is adapted to receive the compact disc. The case also comprises a cover shell sized to fit over the base shell and including a planar top wall, two opposite side walls and a rear end hingely connected to a rear end of the base shell. The cover shell is pivotable between an open position away from the base shell for opening the case and a close position against the base shell for closing the case. A locking mechanism is provided to releasably lock the cover shell in the close position. The case further comprises a biasing means adapted to cooperate with the locking mechanism for biasingly popping up the cover shell in the open position as the locking mechanism is released. The biasing means is characterized in that it comprises at least one elongated torsion spring element, preferably a pair, associated with a corresponding side wall of the cover shell and extending inside the base shell along the rear end thereof. The torsion element is hingely connecting the side wall of the cover shell to the rear end of the base shell. The torsion element comprises a first end portion secured to the corresponding side wall of the cover shell. That first end portion is thereby movable with the cover shell. A second end portion of the torsion element is immobilized along the rear end of the base shell. The torsion element further comprises a twistable central portion extending between the first end and the second end portion and disposed such that it is twisted as the cover shell is locked in the lock position and relaxed as the cover shell is in the torsion position, thereby popping up the cover shell when it is unlocked.

Advantageously the case according to the present invention which is part of a ferocious market combines simplicity and inexpensiveness to manufacture with durability and trouble-free in operation.

A non restrictive description of preferred embodiments of the present invention will now be given with reference to the appended drawings.

DETAILED DESCRIPTION

Figure 1:
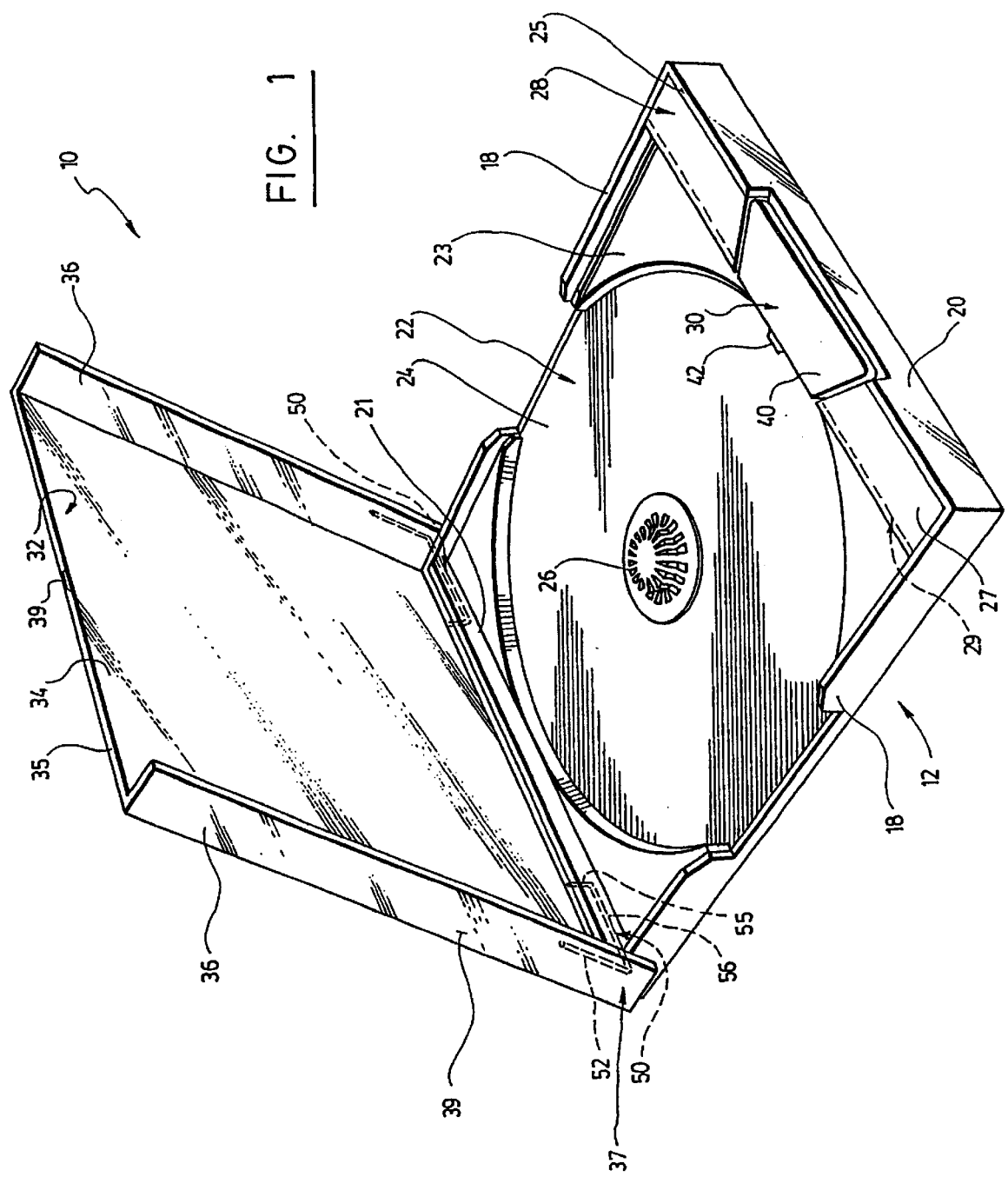
FIG. 1 is a perspective view of a preferred embodiment of a CD carrying case according to the present invention in an opened configuration.
Figure 2:
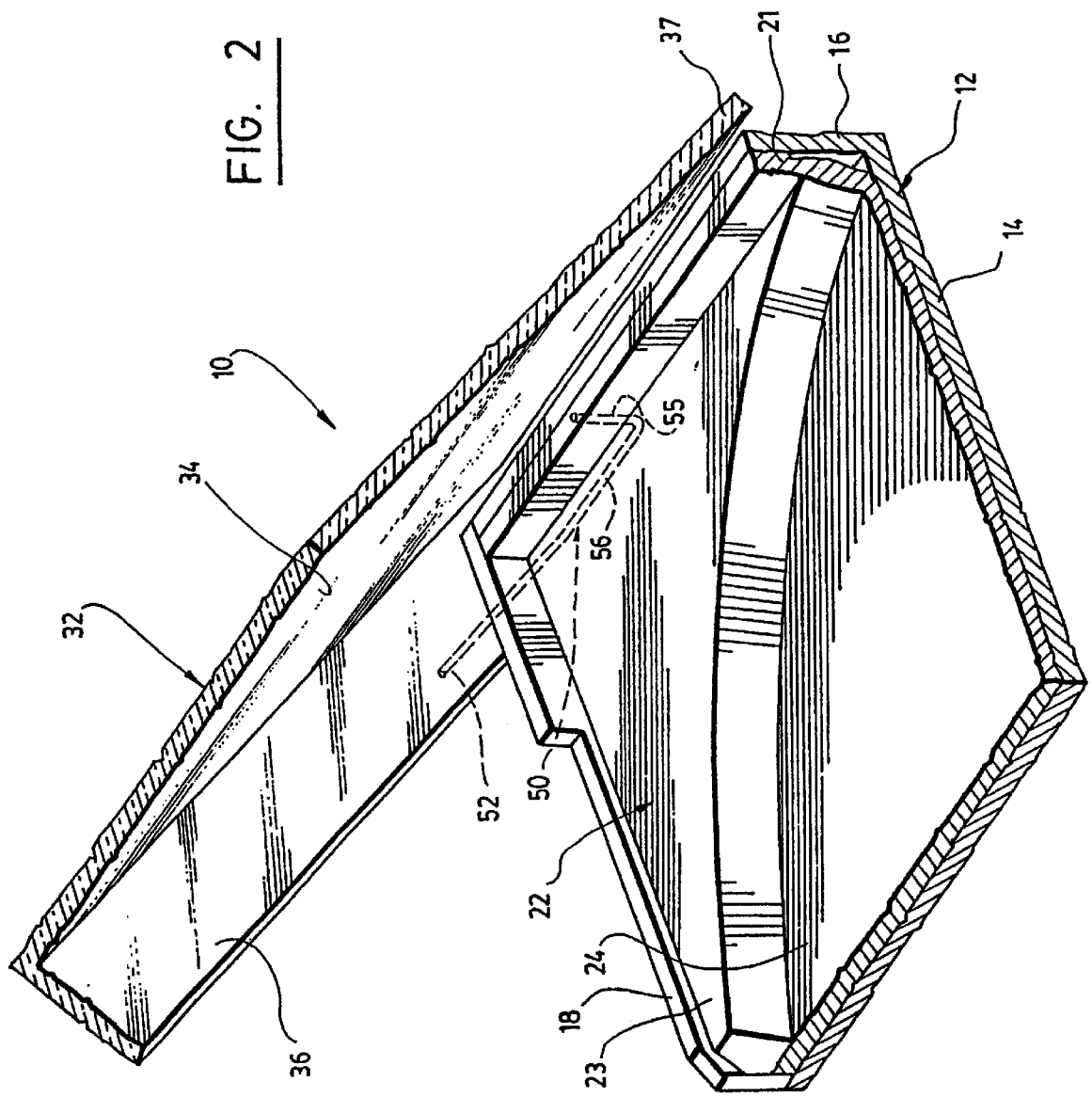
FIG. 2 is an enlarged partial perspective view of the left corner of the case of FIG. 1 showing a torsion spring element mounted at that corner.

Referring to FIGS. 1 and 2, there is shown a CD carrying case (10) according to a preferred embodiment of the present invention. As conventional CD cases, the case (10) includes a box-liked base shell (12) having a conventional substantially parallelepiped-shaped configuration. The base shell (12) comprises a bottom wall (14), a perpendicularly extending rear wall (16) defining its rear end, a pair of perpendicularly extending side walls (18) and a perpendicularly extending front wall (20).

Figure 3:
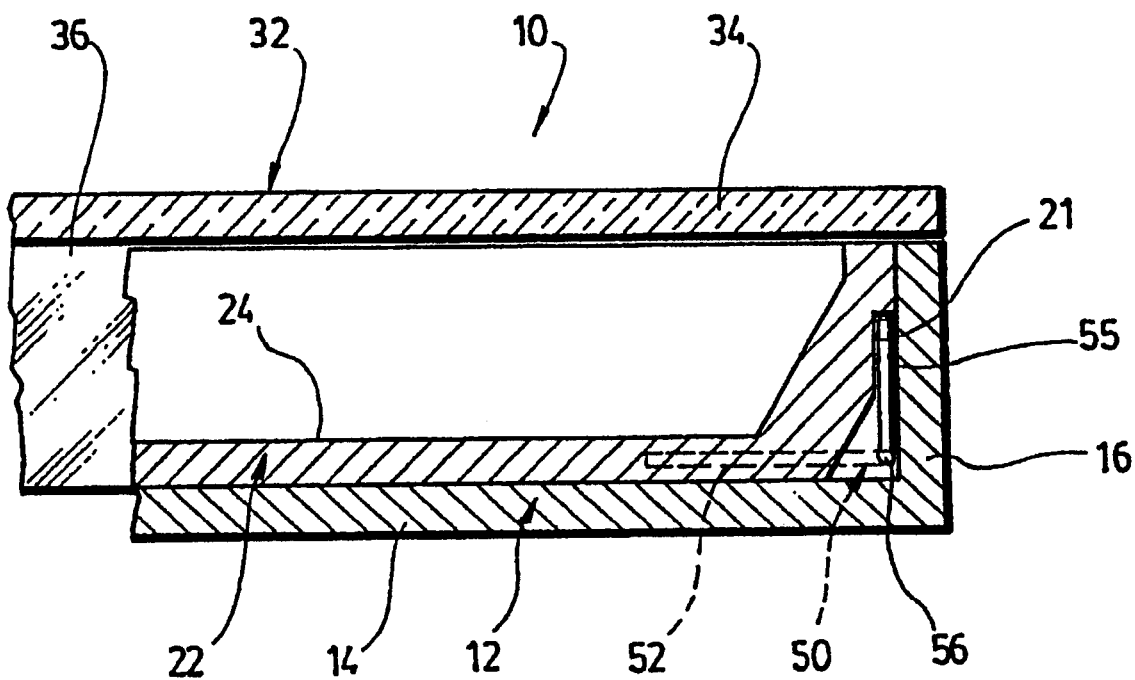
FIG. 3 is a fragmentary cross-section of side view of the rear side of the case of FIG. 1 seen from its right side and showing the case in a close position.

The case (10) further comprises a cover shell (32) sized to fit over the base shell (12) and including a planar top wall (34) and two opposite perpendicular side walls (36) extending integrally from the side peripheral edges of the cover shell (32). The cover shell (32) has a rear end (37) hingely connected to the rear end (16) of the base shell (12). The cover shell (32) is thus pivotable between an open position away from the base shell (12) for opening the case (10), as shown in FIGS. 1 and 2, and a close. position against the base shell (12) for closing the case (10), as shown in FIG. 3.

A tray (22) made of plastic and sized to tightly fit in the base shell (12) is inserted therein. The tray (22) has a planar surface (23) defining a substantially centrally disc-shaped recess (24). The disc-shaped recess (24) is preferably configured and sized so as to fittingly receive a compact disc (not illustrated). In this preferred embodiment, a centrally disposed rosette-type gripping component (26) extends integrally and substantially upwardly from the recess (24). The gripping component (26) is adapted to releasably secure the compact disc inside the recess (24). The tray (22) includes an elevated front end section (28) extending from its planar surface (23) and positioned along a front end (25) of the base shell (12). As illustrated, the elevated front end section (28) defines a planar portion (27) and a riser (29), the riser (29) connecting this planar portion (27) to the planar surface (23) of the tray (22).

Although not illustrated but easy to visualize, the top wall (34) of the cover shell (32) has a front edge (35).which is positioned along the riser (29) of the front end section (28) as the case is in the closed position.

A locking mechanism is provided for releasably locking the cover shell (32) in the closed position. In the preferred embodiment illustrated, the locking mechanism comprises a release push-button (30) located in the elevated front end section (28) of the tray (22). This push-button (30) is integrally formed by cutting the plastic of the front end section (28). It comprises a locking tongue (40) having a distal frontward protruding lip (42) which extends integrally from the back peripheral edge of the push-button (30). The locking tongue (40) of the push-button (30) and its lip (42) are adapted to cooperate with the front peripheral edge (35) of the cover shell (32) for releasably locking the cover shell (32) in a closed position. For this purpose, the front edge (35) of the cover shell is preferably provided with a protruding tip (39) devised to be engaged by the push-button (30). The locking tongue (40) is adapted to pivot upon pressure on the push-button (30) between a first position where it abuttingly contacts the front peripheral edge (35) of the cover shell (32) and a second position where it clears the same.

It should be understood that other types of locking mechanisms could be used with the present invention, as long as it enables the cover shell to be releasably locked on the base shell.

Figure 5:
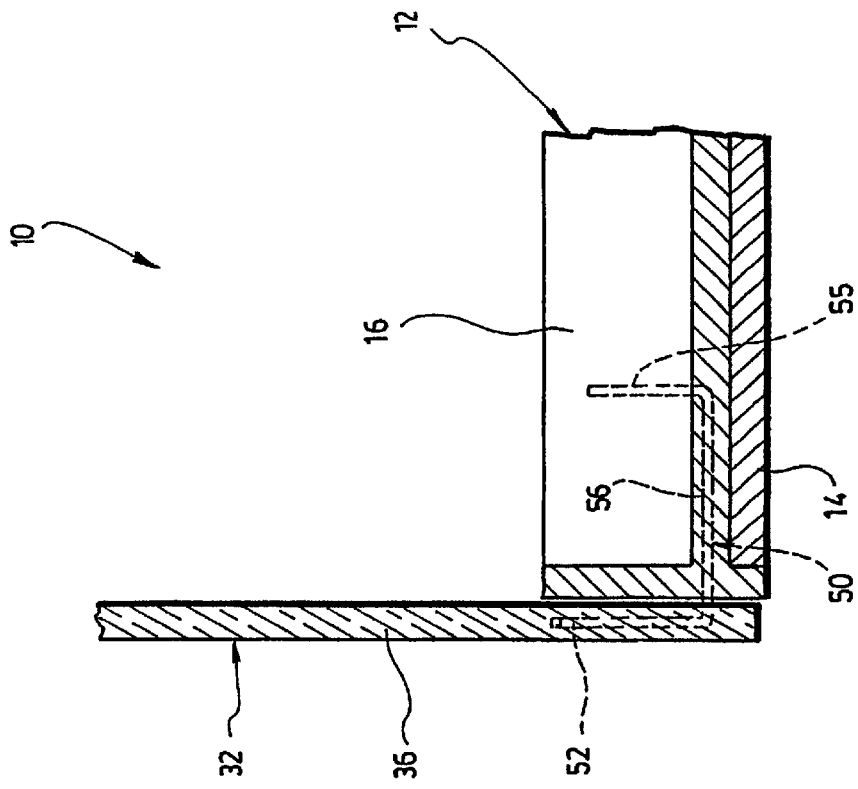
FIG. 5 is a fragmentary front view of the left cover of the case shown in FIG. 2 but seen from the front.
Figure 4:
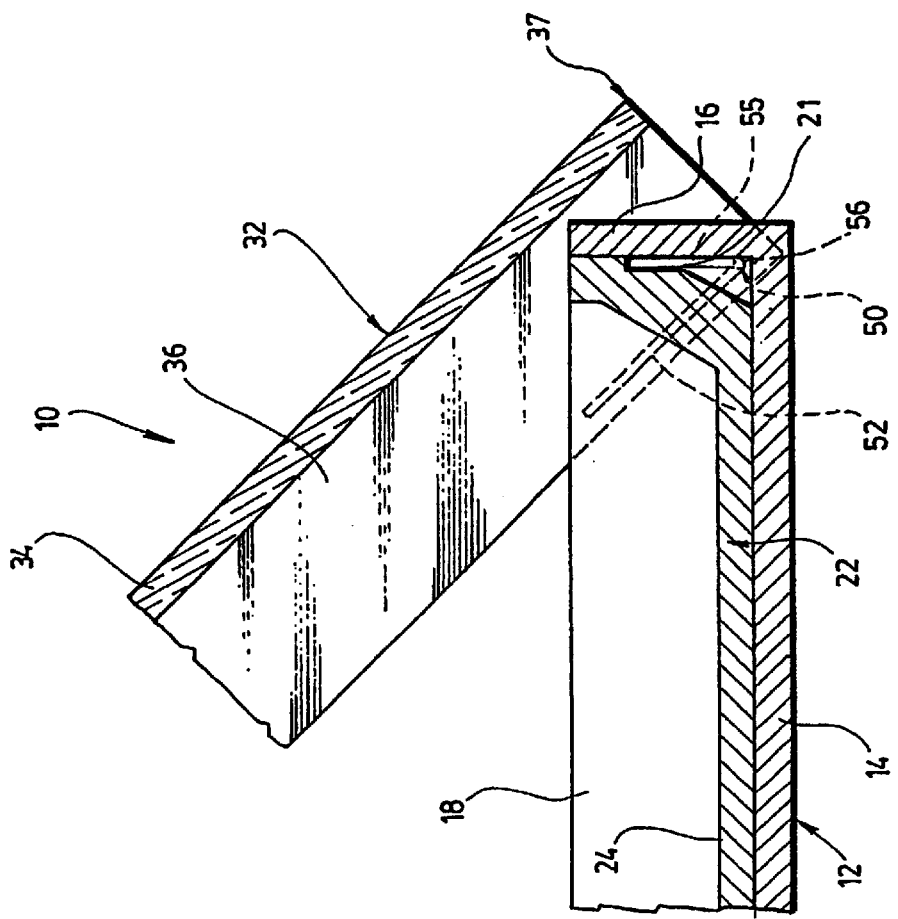
FIG. 4 is the same view as FIG. 3 showing the case partially open.

As conventional CD cases, the base shell (12), the cover shell (32) and the tray (22) are preferably made of a thermosetting plastic such as polystyrene or any other thermosetting plastic known in the art. The base shell (12) and the cover shell (32) may advantageously be translucent The case (10) according to the present invention further comprises a biasing mechanism adapted to cooperate with the push-button (30) for biasingly popping up the cover shell (32) in the open position as the locking mechanism is released. Referring to FIG. 1, the biasing mechanism comprises an elongated torsion spring element (50) associated with each side wall (36) of the cover shell. Referring more particularly to FIGS. 3 to 5, each torsion element (50) extends inside the base shell (12) along the rear end thereof. As best seen from FIG. 5, each of the torsion elements (50) preferably consist of an elongated U-shaped metal rod having a first end portion (52) and a second end portion (55) defining opposite arms of the U extending at right angle with a twistable central portion (56).

Each of the torsion element (50) is hingely connecting a corresponding side wall (18) of the cover shell (32) to the base shell (12). More particularly, the first end portion (52) is secured to a corresponding side wall (36) of the cover shell (32) near the rear end thereof and is thus movable with the cover shell (32) as the cover (32) is pivoted towards or away from the base shell (12), and the second end is immobilized along the rear end (16) of the base shell (12). Preferably, the first end portion (52) is embedded by a casting process within the side wall (36), as it is illustrated in FIG. 5. In another preferred embodiment of the present invention not illustrated, this first end portion (52) could also be simply glued to the side wall (36).

Referring more particularly to FIGS. 3 and 4, the second end portion (55) of each of the torsion element (50) is immobilized along the rear end (16) of the base shell (12) with the help of the tray (22). As can be appreciated, the tray (22) which is insertable in the base shell (12) and sized to tightly fit thereto has a rear wall (21) associated with the rear wall (16) of the base shell (12). The rear wall (21) thus exercise a counter-pressure on the second end portion (55) of the torsion element (50) such that this end (55) is squeezed and immobilized along the rear end (16) of the base shell (12). However, as the first end portion (52), the second end portion (55) could also be embedded by casting within the back wall (16) of the base shell (12) or simply glued to said wall (16).

The central portion (56) of the torsion element (50) is in a twisted state as the cover shell (32) is in the lock position, as shown in FIG. 3, and in a relaxed state as the cover shell (32) is in the open position, as shown in FIG. 5. During a normal use, since the torsion element (50) is U-shaped, it is therefore entirely relaxed when the cover shell (32) is open to form a 90° angle with the box-like base shell (12). The torsion element (50) is thus twisted as the cover shell (32) is closed, thereby popping up the cover shell (32) when it is unlocked. It is also twisted when the cover shell (32) is entirely open that is to say when the cover shell (32) defines a 180° angle with the base shell (12), thereby slowing down the opening movement of the cover shell (32) as soon as it past the 90° angle.

Referring to FIG. 3, the cover shell (32) is shown in a closed position. In FIG. 4, the push-button has just been pressed for releasing the cover shell (32) and the torsion element (50) has started to regain its relaxed U-shape configuration, as shown in FIG. 5, thereby lifting up the cover (32).

As can be appreciated, in the preferred embodiment illustrated throughout, the top wall (34) of the cover shell (32) is slightly wider than the bottom wall (14) of the base shell (12), whereby the side walls (36) of the cover shell (32) are extending outside the base shell (12) as the case (10) is closed. Therefore, in order to leave a free passage for the central portion (56) of the torsion element (50) up to the first end (50), the side wall (18) of the base shell (12) may be provided with a bore. However, it should be understood that in another preferred embodiment (not illustrated), the side walls of the cover shell could easily extend inside the base shell. In that case, there is no need for providing the side wall (18) of the base shell (12) with a bore. Likewise, a bore may also be provided within the rear end of the side wall (36) of the cover shell (32) if the first end (52) of the torsion element (50) is to be glued to the outside of said wall (36).

In the illustrated preferred embodiment, the torsion element (50) replaces the legs found in conventional CD case. Therefore, The case for storing a CD in accordance with the present invention is more reliable and long lasting since it does not require fragile plastic legs. However, it has to be understood that the present invention is not limited to legs-free CD cases.

Although preferred embodiments of the invention have been described in detail herein and illustrated in the accompanying drawings, it is to be understood that the invention is not limited to this embodiment and that various changes and modifications may be effected therein without departing from the scope or spirit of the invention.

What is claimed is:

1. A case for storing a compact disc comprising:
    a box-like base shell formed of a planar bottom wall, two opposite side walls, a rear wall and a front wall, the base shell being adapted to receive the compact disc;
    a cover shell sized to fit over the base shell and including a planar top wall, two opposite side walls and a rear end hingely connected to a rear end of the base shell, the cover shell being pivotable between an open position away from the base shell for opening the case and a close position against the base shell for closing the case;
    a locking mechanism to releasably lock the cover shell in the close position; and
    biasing means adapted to cooperate with the locking mechanism for biasingly popping up the cover shell in the open position as the locking mechanism is released, the biasing means comprising:
        at least one elongated torsion spring element associated with a corresponding side wall of the cover shell and extending inside the base shell along the rear end thereof, the torsion element hingely connecting said corresponding side wall of the cover shell to the rear end of the base shell; and having:
        a first end portion secured to said corresponding side wall of the cover shell and thereby being movable therewith;
        a second end portion immobilized along the rear end of the base shell; and
        a twistable central portion extending between the first end portion and the second end portion and being disposed such that it is twisted as the cover shell is locked in the locked position and relaxed as the cover shell is in the open position, thereby popping up the cover shell as it is unlocked.

2. A case for storing a compact disc as claimed in claim 1, wherein the biasing means comprises a pair of said at least one elongated torsion spring element each associated with a corresponding side wall of the cover shell.

3. A case for storing a compact disc as claimed in claim 2, wherein the first end portion of each of said elongated torsion spring element is extending at right angle with the central portion.

4. A case for storing a compact disc as claimed in claim 3 wherein:
    the first end portion of each of said elongated torsion spring element is embedded into the corresponding side wall of the cover shell.

5. A case for storing a compact disc as claimed in claim 4, wherein, for each of the torsion spring elements, the second end portion is extending at right angle with the central portion and upwardly therefrom.

6. A case for storing a compact disc as claimed in claim 5, comprising a tray insertable in the base shell and having a planar surface defining a substantially disc-shaped recess to receive the compact disc, the tray being sized to tightly fit in the base shell and having a rear wall associated with the rear wall of the base shell such that the second end portion of each of the torsion spring element is squeezed and immobilized along the rear end of the base shell between the rear wall of the base shell and the rear wall of the tray.

7. A case for storing a compact disc as claimed in claim 6, wherein each of the torsion spring element in a relaxed state has a U shape, the first and the second end portion defining opposite arms of the U.

8. A case for storing a compact disc as claimed in claim 7, wherein:
    the tray includes an elevated front end section extending from the planar surface and positioned along a front end of the base shell, the elevated front end section defining a planar portion and a riser connecting the planar portion to the planar surface of the tray; and
    the top wall of the cover shell has a front edge positioned along the riser of the front end section as the case is in the close position.

9. A case for storing a compact disc as claimed in claim 8, wherein the locking mechanism comprises a push-button located in the front end section of the tray and adapted to cooperate with the front edge of the cover shell.

10. A case for storing a compact disc as claimed in claim 9, wherein the push-button is integrally formed in the front end section of the tray and comprises a locking tongue protruding from a rear edge of the push-button, the locking tongue being adapted to pivot upon pressure on the push-button between a first position, where it abuttingly contacts the front edge of the cover shell, and a second position where it clears the same.

* * * * *